United States Patent [19]    [11] Patent Number: 5,162,034
Rau et al.    [45] Date of Patent: Nov. 10, 1992

[54] MODULAR PAPER DEFORMATION SYSTEM WITH CHANGEABLE DEFORMATION TOOL DRAWER

[75] Inventors: Gunnar Rau, Königsbrunn; Albert Heller, Pestenacker, both of Fed. Rep. of Germany

[73] Assignee: Man Roland Druckmaschinen AG, Offenbach am Main, Fed. Rep. of Germany

[21] Appl. No.: 739,348

[22] Filed: Aug. 1, 1991

[30] Foreign Application Priority Data

Sep. 29, 1990 [DE] Fed. Rep. of Germany ....... 4030864

[51] Int. Cl.⁵ .............................................. B41F 13/00
[52] U.S. Cl. ....................................... 493/395; 83/698; 72/238; 72/239; 493/480
[58] Field of Search ............... 493/340, 395, 396, 400, 493/401, 480; 83/698; 72/238, 239

[56] References Cited

U.S. PATENT DOCUMENTS 1,666,431  4/1928  Trosch .
3,192,500  7/1965  Jones .
3,296,910  1/1967  Haskin, Jr. ............................ 83/698
4,222,258  9/1980  Field ..................................... 72/239
4,627,831  12/1986 Hirakawa ............................. 493/463

FOREIGN PATENT DOCUMENTS 0264347  4/1988  European Pat. Off. .
1111906  7/1961  Fed. Rep. of Germany .
2257397  8/1975  France .
2276179  1/1976  France .

Primary Examiner—Bruce M. Kisliuk
Assistant Examiner—Jack W. Lavinder
Attorney, Agent, or Firm—Frishauf, Holtz, Goodman & Woodward

[57] ABSTRACT

To accurately place a modular replaceable or changeable deformation tool drawer (200) in position on a frame frame (1), and permit a variety of different operating procedures to be carried out on printed products supplied to the system without requiring substantial adjustment, the operating tools are retained in a box-like deformation tool drawer which can be inserted in the frame, and held in position by a group of clamping elements, such as fluid operated or electromagnetic cylinders and/or pistons, and, in addition, hold-down screws (6) are secured to the frame to hold the drawer in position on the frame and permit fine adjustment thereof with respect to the frame, and hence with respect to a paper web passing therethrough, before securely clamping the drawer by the clamping elements for production operation.

12 Claims, 2 Drawing Sheets

MODULAR PAPER DEFORMATION SYSTEM WITH CHANGEABLE DEFORMATION TOOL DRAWER

Reference to related application, the disclosure of which is by incorporated by reference, assigned to the assignee of the present application: Ser. No. 07/739,191, filed Aug. 1, 1991 still pending, RAU et al.

FIELD OF THE INVENTION

The present invention relates to paper processing, and more particularly to paper being received in sheet or web form from a rotary printing machine, which permits deforming the paper, for example by punching, perforating the paper or otherwise forming cuts or grooves or holes in the paper, for example to apply index markings or the like. The paper deformation system is particularly suitable as part of a paper handling system as described in the copending application Ser. No. 07/739,191, filed Aug. 1, 1991, RAU et al. and which is for example used in combination with a folder to print books, calendars and the like.

BACKGROUND

Changeable deformation tool systems, for example drilling, perforating, cutting or punching tools, are used in many machine tools to make many different types of products. The systems are frequently built in modular form, to permit change-over from one product or from one deformation mode to another product or to another deformation mode, respectively. This change-over should be rapid, and not require substantial adjustment. The drawer or slide-in tool technology is particularly suitable in some uses, since exchange of tools is simple, and service or repair of any tools which are used likewise is simple. This drawer arrangement, however, has a problem in that tools must be held in a tool holder which must be secured when inserted into the system frame.

THE INVENTION

It is an object to provide a modular paper deformation system, particularly suitable for deforming paper received from a rotary printing machine, in which operating tools can be easily inserted in slide-in form, hereinafter referred to as "tool drawers", with rapid adjustment and exchange and readjustment times. This is particularly important in rotary printing machines, so that a modular drawer can be replaced as the machine runs and prints, and especially placed in position to ensure that the deformation which the particular tool applies to the paper is in exact register with the printed material.

Briefly, a box-like deformation tool drawer is formed with guide means which laterally position the deformation tool drawer in a frame, formed with an insertion channel. The insertion channel is supplied with at least one clamping structure at either side of the drawer, engageable with the guide means of the drawer on the deformation tool to clamp the tool drawer tightly in position, and provide for engagement, for example, with a power drive. In addition, the frame is provided with a hold-down structure secured to the frame, preferably above guide rails thereof, to hold the deformation tool drawer in position on the guide rails, essentially without play when the clamping devices are released, to permit adjustment of the position of the deformation tool drawer, and hence the tools thereof with respect to the frame, in order to ensure register of the deformation tools with respect to the printed subject matter. When adjusted in position, the clamping devices then clamp the tool drawer tight for production runs.

DRAWINGS

FIG. 1 is a highly schematic front view of the modular paper deformation system; and FIG. 2 is a schematic top view of the system, in which paper, for example, can travel from the left towards the right across the tool drawer.

DETAILED DESCRIPTION

Figure 1:
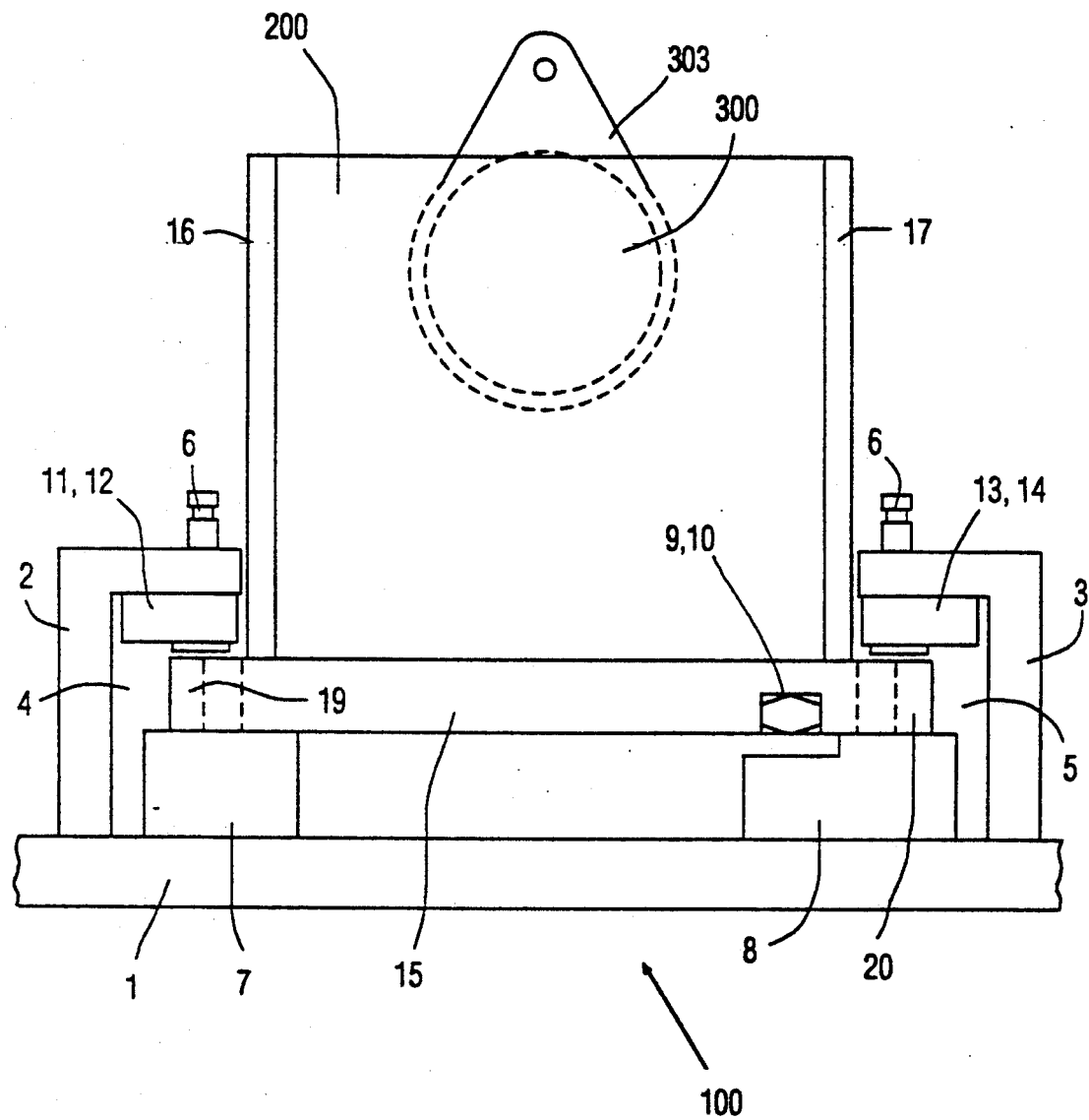

Referring first to FIG. 1:

A frame 1 has two holding rails 2, 3 which have an angled, essentially inverted L shape, located on the frame spaced from each other, parallel to each, and mirror-symmetrically secured to the frame so that, together with the frame, they form an essentially U-shaped channel 4, 5, respectively. Two support rails 7, 8 are secured to the frame 1, the support rails 7, 8 extending essentially parallel to the holding rails 2, 3. The support rail 8 is wider than the support rail 7 and carries two guide rollers 9, 10, having axes which are perpendicular to the surface of the frame 1.

In accordance with a feature of the invention, the system includes four power clamping arrangements which, in the example illustrated, are fluid cylinder-piston systems 11, 12, 13, 14. They may be operated hydraulically or pneumatically; other clamping arrangements, for example electromagnetic clamping arrangements, may be used. Two, each, clamping cylinders 11, 12 and 13, 14 are secured to the legs of the holding rails 2, 3 which are parallel to the frame 1.

In accordance with another feature of the invention, a hold-down element, in the example selected a screw 6 with a lock nut, is secured on each one of the legs of the holding rails 2, 3 which are parallel to the frame 1. The function of the hold-down element 6 will be described in detail below.

The frame described so far is used to hold an operating tool drawer 200 therein. The operating tool drawer 200, essentially, is a block-shaped body having a bottom 15, two side walls 1, 17, and a back wall 18—see FIG. 2. At the bottom, the tool drawer 200 is formed with or has secured thereto two laterally projecting rails 19, 20, projecting beyond the side walls 16, 17.

Figure 2:
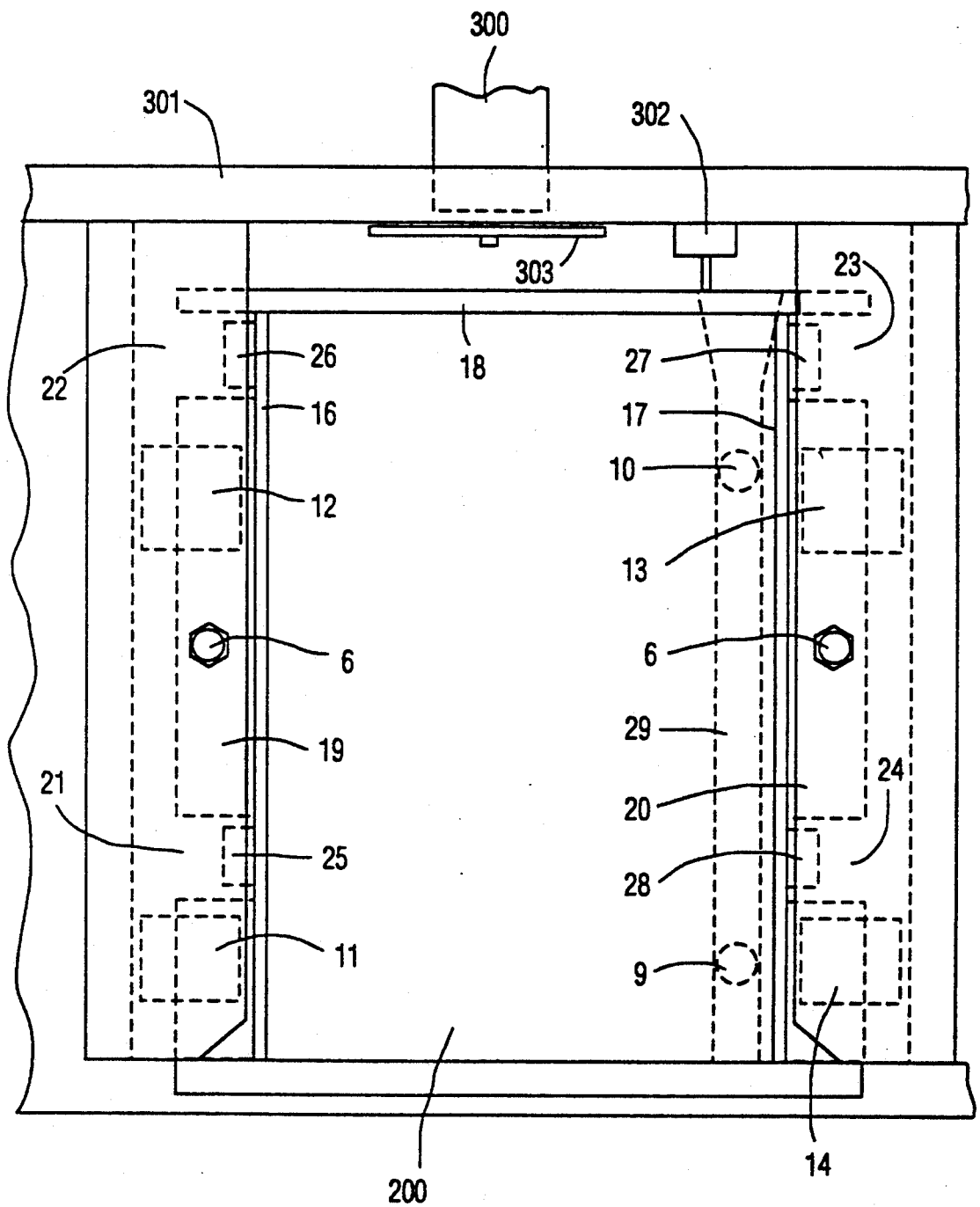

FIG. 2 is a highly schematic top view of the system 100 with a tool drawer 200 inserted therein. The guide rollers 9, 10 as well as the clamping cylinders 11–14 are seen. The frame is closed off at the back by a closing wall 301, secured perpendicularly to the base members of the frame 1. The back wall 301 includes a drive unit 300 to drive operating tools in the drawer 200.

The laterally projecting rails 19, 20 of the tool drawers, as seen in FIG. 2, are formed with recesses 21, 22 and 23, 24, respectively. Four casters or wheels 25, 26 and 27, 28, having axes of rotation parallel to the bottom wall 15, are located in these recesses. The drawer 200 additionally is formed with a groove 29, parallel to the projecting rail 20, to receive the guide rollers 9, 10 secured to the frame 1. The groove 29, at the rear end, is flared outwardly to facilitate introduction and insertion of the drawer 200 and alignment of the drawer 200 in the system 100. The flared opening flares outwardly towards the back wall 18 of the drawer 200.

OPERATION, AND DRAWER INSERTION

To insert a drawer 200 into the system 100, the drawer 200 is first set with its rear running rollers or casters 26, 27 on the support rails 7, 8 and then pushed towards the back wall 301. This places the guide roller 9, and then the guide roller 10, into the groove 29, thereby aligning the drawer 200 with the drive 300, until it engages therewith. FIG. 2 illustrates the position just before engagement. The drive 300 can be started, as well known, by switching a position or limit switch 302 secured, for example, in or on the closing wall 301, and a cover plate 303, which can pivot in front of the drive 300, or release the covering position to permit engagement of the tools in the drawer 200 with the drive 300. Suitable electrical or other interlocking systems can be provided so that, unless switch 302 senses presence of a drawer 200, the drive 300 is covered by the plate 303, and released only when there is no danger of an operator touching a running drive. Only after the plate 303 has moved out of covering position, can the tool drawer be inserted fully for engagement of tools with the drive 300.

When the drawer 200 is engaged with the drive 300, for example by engagement of a severable clutch element or the like, it is then necessary to align the drawer 200 precisely with respect to a movable web which, for example, in FIG. 2 travels from the left of the figure towards the right across the drawer, for example through suitable slits in the side walls, above the drawer 200 or therebelow, or guided vertically within the drawer 200 by suitable guide rollers therein, or forming part of an external system, as well known in the paper handling art. Lateral adjustment, and control of register of the drawer 200 with respect to a paper web, requires shifting of the drawer 200 along the holding rails 2, 3. When the register is perfect, the clamping cylinders 11-14 are activated and the drawer 200 is securely clamped on the frame 1. To change or adjust the register, however, it is necessary to preliminarily clamp the drawer. To remove the drawer or to change the register, the clamping cylinders which assert a powerful clamping force are deactivated, and reactivated only after the lateral register is perfect. This may be controlled, for example, automatically by a timing circuit, activated after insertion of a cassette, for example in combination with the cover plate 303 or the switch 302, in order to facilitate change of drawer and adjustment for the operator, and to ensure that the tools within the drawer 200 will be operated only when they are reliably secured to the frame 1.

In accordance with a feature of the present invention, and for that period of time during which the clamping cylinders 11-14 are deactivated, that is, do not clamp the drawer, the screws 6 take over holding of the drawer 200 in position, securely enough to permit adjustment. The screws 6 are so adjusted that the drawer 200 can run freely along the support rails 7 and 8 when it is inserted or shifted. Thus, the drawer 200 can be adjusted with respect to lateral register while the printing machine is running, even though the secure clamping effect of the cylinders 11-14 is not yet effective. Screws 6 are provided to prevent vibration of the drawer 200 during running of the printing machine. Vibration within the drawer 200 might damage the drive 300, and particularly a severable clutch connection.

A plurality of such systems can be located next to each other, so that different cutting or deformation patterns can be applied to the printed web which passes through, over or under the tool drawer. The system ensures that the transport path of the web between adjacent systems is short, while permitting rapid adjustment of any station with respect to an adjacent one, and the passing web.

Various changes and modifications may be made within the scope of the inventive concept.

What is claimed is:

1. A modular paper deformation system with a changeable box-like deformation tool drawer (200) including
   a frame (1);
   two holding rails (2, 3) having essentially an inverted L shape mounted on said frame, said rails being spaced from each other,
   wherein the L-shaped rails define open sides,
   said open sides of the L facing each other and defining, therebetween, and together with said frame, an insertion channel (4, 5),
   said box-like deformation tool drawer comprising guide means (19, 20) laterally located on said deformation tool drawer, positionable in said holding rails and engageable in said insertion channel (4, 5);
   each of said holding rails comprising at least two clamping means being (11-14) (2, 3) engageable with said guide means (19, 20) on the deformation tool drawer (200) for clamping said tool drawer in position on said holding rails and hence in said frame (1); and
   a hold-down means (6) secured to each of said holding rails (2, 3) for holding said deformation tool drawer in position on said holding rails (2, 3) essentially without play when said clamping means (11-14) is released to permit adjustment of the position of said deformation tool drawer with respect to said frame and subsequent clamping of said tool drawer in said adjusted position.

2. The system of claim 1, wherein said clamping means comprises fluid operated clamping cylinders (11-14).

3. The system of claim 2, wherein said fluid cylinders (11-14) are hydraulic cylinders.

4. The system of claim 2, wherein said fluid cylinders (11-14) are pneumatic cylinders.

5. The system of claim 1, wherein said clamping means comprises electromagnetic clamping means.

6. The system of claim 1, wherein said frame (1) further includes two support rails (7, 8) located between the holding rails (2, 3) and positioned essentially parallel with respect thereto;
   and wherein at least one of said holding rails includes two spaced guide rollers (9, 10) having axes of rotation perpendicular to said support rails.

7. The system of claim 6, wherein only one of said support rails includes said two guide rollers (9, 10).

8. The system of claim 6, wherein said box-like deformation tool drawer (200) comprises an essentially block-shaped body having a bottom (15), two side walls (16, 17) and a back wall (18);
   said guide means comprises two laterally projecting rails (19, 20), engageable by said clamping means (11-14);
   and wherein said-hold-down means (6) are positioned with respect to said guide rails (19, 20) to permit movement of said tool drawer essentially without play over said support rails (7, 8) and permit fine adjustment of said deformation tool drawer prior to clamping by said clamping means (11-14).

9. The system of claim 6, wherein said box-like deformation tool drawer (200) comprises an essentially block-shaped body having a bottom (15), two side walls (16, 17) and a back wall (18);

said guide means comprises two laterally projecting rails (19, 20), engageable by said clamping means (11-14);

wherein said hold-down means (6) are positioned with respect to said guide rails (19, 20) to permit movement of said tool drawer essentially without play over said support rails (7, 8) and permit fine adjustment of said deformation tool drawer prior to clamping by said clamping means (11-14), and wherein said bottom (15) of the deformation tool drawer (200) is formed with at least one guide groove (29) in which said guide rollers (9, 10) are engageable for guiding the position of said tool drawer with respect to said frame during insertion movement of the tool drawer of said frame.

10. The system of claim 1, wherein said hold-down means comprises clamping screws (6) passing through each of said L-shaped holding rails.

11. The system of claim 10, wherein said holding screws include counter nuts for securing said holding rails in position.

12. The system of claim 1, wherein four clamping means are provided, two, each, being located on each of said guide rails (2, 3).

* * * * *